UNITED STATES PATENT OFFICE.

THOMAS H. BERRY, OF LYNN, MASSACHUSETTS.

IMPROVEMENT IN THE MODES OF PREPARING COFFEE FOR TRANSPORTATION.

Specification forming part of Letters Patent No. 63,987, dated April 23, 1867; reissue No 5,933, dated June 23, 1874; application filed May 23, 1874.

*To all whom it may concern:*

Be it known that I, THOMAS H. BERRY, of Lynn, in the county of Essex and State of Massachusetts, have invented a new and useful Method of Preparing Coffee for Transportation and the Market; and I do hereby declare that the following is a full and exact description thereof.

The nature of my invention consists in combining with roasted coffee, either whole or ground, certain glutinous substances in such a manner that each particle shall be rendered impervious to air, and also to make the coffee capable of being compressed into a mass that shall receive and retain any desirable shape.

To enable others skilled in similar processes to prepare coffee by this method, I will proceed to describe the composition and manner of working.

I first make a solution of one ounce of French isinglass and four ounces of pure water. The coffee to be acted upon is placed in a suitable vessel, and the solution described sprinkled carefully over the mass, the whole being constantly stirred until each separate particle of coffee is covered.

I have found by experiment that the best proportion is one ounce of French isinglass to four fluid ounces of water for one pound of coffee.

The mass, mixed as above described, before being allowed to become too dry, may be put into molds, of any desired size and form, and pressed into cakes.

The advantages that I claim for my new process of preparing coffee are these: Each grain of coffee being covered or varnished with the glutinous material above described, it retains its full flavor and strength; also, coffee prepared in this manner admits of being pressed into cakes, thus rendering it very convenient to pack and to transport.

The fact that this article when compressed is much more compact than coffee, as usually packed and sold, together with the fact that it will retain its strength for a long time, renders it very valuable for travelers.

I am aware that packages of coffee, cocoa, and similar articles have been coated with gelatinous and other impermeable coverings for the purpose of preventing the dispersion of the aroma, but such covering I do not claim.

The spirit of my invention consists in mixing with coffee some innoxious ingredient that shall cover each grain, making it proof against the action of the atmosphere.

Having thus described my invention, I claim as new and desire to secure by Letters Patent of the United States—

The above-described method of preparing coffee, substantially as and for the purpose set forth.

THOS. H. BERRY.

Witnesses:
M. E. STAMPER,
M. P. HARWOOD.